3,054,722
PROCESS OF TREATING COCCIDIOSIS WITH 5-NITROBENZIMIDAZOLES
Christian Wiegand and Kurt Kaemmerer, Wuppertal-Elberfeld, Germany, assignors to Farbenfabriken Bayer Aktiengesellschaft, Leverkusen-Bayerwerk, Germany
No Drawing. Filed Sept. 23, 1960, Ser. No. 57,878
9 Claims. (Cl. 167—53.1)

This invention relates in general to unique veterinary practices and compositions of matter for combatting coccidiosis in fowl. In particular, the invention involves the provision of therapeutic techniques for the treatment and prophylaxis of coccidiosis in fowl through the adminstration to the afflicted host of nitrobenzimidazoles or soluble salts of nitrobenzimidazoles.

The causative pathogenic protozoan of the aforementioned fowl malady is responsible annually for great economic losses, particularly in the areas of temperate climate. Since it exhibits in its evolution cycle as a subclass of the Telosporidiae, a certain similarity to malarial parasites, antimalarial remedies have been employed heretofore with some success in the experimental treatment of the disease. By reason of the relatively high cost of such remedial compositions, however, they—like the sulfonamides—have not proven to be economically practical for wide-scale application.

The present invention is based on our discovery that nitrated benzimidazoles, per se, as well as their water-soluble salts with strong acids are highly efficacious in the treatment of fowl coccidiosis. Suitable acids from which the appropriate therapeutically active soluble acid salts of the nitrobenzimidazoles may be prepared include, for example, hydrochloric acid, sulfuric acid and phosphoric acid.

In essence, therefore, the present invention is directed to the method of treating coccidiosis in fowl by introduction into the gastro-intestinal tract of a bird infected with the causative pathogenic agent of the disease and infection, a therapeutic amount of a nitrated benzimidazole or an acid salt of a nitrated benzimidazole.

5-nitro-benzimidazoles having a hydrogen atom or an alkyl radical attached to the 2-position thereof and inorganic acid salts of these compounds are particularly valuable for use in the practice of the present invention. These compounds, which are readily converted to their corresponding soluble salts by reaction with a strong inorganic acid, may be represented by the following general formula:

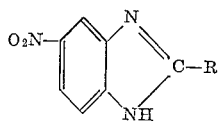

wherein R is a member selected from the group consisting of a hydrogen atom and an alkyl radical; and most desirably a lower alkyl radical containing from 1 to 6 carbon atoms.

Illustrative of the nitrated benzimidazoles which are useful in the practice of the invention are 5-nitrobenzimidazole; 2 - ethyl - 5 - nitrobenzimidazole; 2-methyl-5-nitrobenzimidazole; 2-isopropyl-5-nitrobenzimidazole, etc.

Illustrative of the acid salts of suitable nitrated benzimidazoles suitable for introduction into the intestinal tract of fowl in accordance the practice described hereinbefore are 5-nitrobenzimidazole hydrochloride; 2-ethyl-5-nitrobenzimidazole hydrochloride; 5-nitrobenzimidazole phosphate; 2-ethyl-5-nitrobenzimidazole sulfate; 5-nitrobenzimidazole sulfate; 5-nitrobenzimidazole phosphate; 2-methyl-5-nitrobenzimidazole sulfate; 2-methyl-5-nitrobenzimidazole phosphate; 2-methyl-5-nitrobenzimidazole hydrochloride; 2-isopropyl-5-nitrobenzimidazole sulfate; 2-isopropyl-5-nitrobenzimidazole phosphate; and, most desirably, 2-isopropyl-5-nitrobenzimidazole hydrochloride.

The nitrated benzimidazoles and their corresponding soluble salts are readily prepared by reaction of the corresponding nitrated phenylenediamine with a carboxylic acid, preferably one containing from 1 to 6 carbon atoms; with subsequent reaction of the resulting benzimidazole with an inorganic acid, if desired.

For example, 100 grams of 5-nitrobenzimidazole, prepared by reaction of 4-nitrophenylenediamine with formic acid, can be dissolved in one liter of hot acetone to which 60 cubic centimeters of water are added and the solution heated under refluxing conditions in the presence of bleaching earth. The reaction is permitted to proceed and the resulting colorless filtrate is rendered acidic with pure concentrated hydrochloric acid until a distinctly acidic indication is given to Congo red. On cooling, 5-nitrobenzimidazole hydrochloride is separated out in the form of thin, colorless prisms (yield: 63.5 grams; melting point: 254° C.–258° C.). By concentrating the acetonic mother-liquor, an additional 32 grams of 5-nitrobenzimidazole hydrochloride can be recovered.

Similarly, 5-nitrobenzimidazole dissolved in three to five times its weight of pure sulfuric acid (20 percent conc.) while heated for a short period, on cooling also yields 5-nitrobenzimidazole sulfate, which separates out in the form of small colorless prisms readily soluble in water (melting point 173° C.–176° C.).

Similarly, 2-methyl-5-nitrobenzimidazole hydrochloride is produced, by way of illustration, by dissolving 100 grams of the base, 2-methyl-5-nitrobenzimidazole; prepared by reaction of 4-nitrophenylenediamine with glacial acetic acid; in one liter of absolute alcohol with the assistance of heat and clarification with bone char. Hydrogen chloride gas is passed through the resulting filtrate until a distinct acidic reaction is had to Congo red. A yield of 90 grams of 2-methyl-5-nitrobenzimidazole hydrochloride is thus obtained in the form of soft, felted crystals. An additional 15 grams of the salt can be obtained by concentration of the alcoholic mother-liquor (M.P. 255° C.–258° C.).

The reaction of 4-nitrophenylenediamine with propionic acid yields, in like manner, 2-ethyl-5-nitrobenzimidazole (M.P. 175° C.–177° C.). This latter product, when dissolved, for example, in ten times its weight of acetone to which, in turn, 60 cubic centimeters of water are added, and the solution heated under reflux in the presence of bleaching earth, yields a colorless filtrate. This filtrate is rendered acidic with pure concentrated hydrochloric acid until the solution gives a distinctly acidic indication with Congo red, and, on cooling, yields microcrystalline prisms of 5-nitrobenzimidazole hydrochloride melting at 278° C.–279° C. with decomposition.

By way of further illustration, 2-isopropyl-5-nitrobenzimidazole; prepared by reacting 4-nitrophenylenediamine and isobutyric acid (M.P. 123° C.–125° C.); when dissolved in ten times its weight of 2-N-hydrochloric acid, and the resulting solution clarified with bone char and evaporated on a steam bath, yields, upon redissolution from isopropanol, 2-isopropyl-5-nitrobenzimidazole hydrochloride in the form of colorless, felted needles melting at 255° C.–257° C. with decomposition.

Th preferred mode of administration of the compounds of the invention for combatting fowl coccidiosis is in a concentration of approximately 0.1 percent by weight of the feed filler or other ingestible carrier to which they are added. Alternatively, the compounds can be administered directly in capsule form. They are normally administered to the infected fowl over a period of at least four days.

The following examples are further illustrative of the present invention and demonstrate the efficacy of the therapeutic compositions described herein in the treatment of fowl coccidiosis:

*Example I*

Chicks 10 to 14 days old were infected with an oocystic suspension of the coccidian, *Eimeria tenella* by standard procedure in such a manner that 100,000 sporulated oocysts were administered to each chick. The animals were kept on a non-renewed litter in order to induce a steady superinfection. Four days prior to administration of the pathogenic organism, each of the fowl was given a feed containing 2-isopropyl-5-nitrobenzimidazole hydrochloride in a concentration of 0.1 percent. The duration of the test period after initial infection was fourteen days.

A control group of equal size was infected in the same manner, but given a feed without the additive, 2-isopropyl-5-nitrobenzimidazole hydrochloride. Within the duration of the test period, 100 percent of the animals in the control group died of the massive infection. Of the test group to which 2-isopropyl-5-nitrobenzimidazole hydrochloride was administered, 100 percent survived. An autopsy of the surviving birds showed that the caecum of each of the chicks of the test group retained a normally pale appearance macroscopically and was otherwise unchanged.

*Example II*

Ten (10) white-Leghorn chicks, 11 days old, confined in a cage, were infected with an oocystic suspension in such a manner that each bird received 100,000 sporulated oocysts of *Eimeria tenella*. From the day of infection, the animals were given, per os and in capsule form, 5-nitrobenzimidazole as an active agent, viz., to 5 chicks 5 milligrams per animal per day and to 5 chicks 3 milligrams per animal per day. The survival rate was 60 and 80%, respectively, whereas of 5 untreated control animals, 100% died.

*Example III*

Five (5) white-Leghorn chicks, 11 days old, confined in a cage were infected with an oocystic suspension in such a manner that each bird received 100,000 sporulated oocysts of *Eimeria tenella*. From the day of infection, the birds were given, per os and in capsule form, 2-methyl-5-nitrobenzimidazole as an active agent at the rate of 5 milligrams per animal per day. The rate of survival of the treated animals was 80%, whereas in a control group none of the birds survived.

*Example IV*

Twenty-seven (27) white-Leghorn chicks, 11 days old, maintained on a non-renewed infested litter in order to induce a steady super-infection, were given a feed containing in admixture therewith 0.1% of the insoluble active agent 5-nitrobenzimidazole, whereas another 27 chicks maintained under similar conditions were given 0.1% of the soluble active agent 5-nitrobenzimidazole hydrochloride. Four (4) days following start of the feed test, the chicks were infected with 100,000 sporulated oocysts of *Eimeria tenella*. Of the group treated with 5-nitrobenzimidazole, 89% survived, whereas of those treated with 5-nitrobenzimidazole hydrochloride, 78% survived. In a control group of 27 Leghorn chicks infected in the same manner and supplied with the same feed, but without any active agent, only 18% survived.

*Example V*

Three (3) groups, each comprised of 30 white-Leghorn chicks, were given in field tests conducted on an infested permanent straw litter, a feed containing 0.1 and 0.2% respectively, of 2-methyl-5-nitrobenzimidazole hydrochloride. The third group was maintained on untreated feed as a control group. Four (4) days after the start of the feed test, all of the chicks were infected with 100,000 sporulated oocysts of *Eimeria tenella*. The following are the survival rates for the three respective groups:

|  | Percent |
|---|---|
| 0.2% active agent | 80 |
| 0.1% active agent | 88 |
| Control group | 32 |

This application constitutes a continuation-in-part replacement of our former copending application Serial Number 32,558, which was filed on May 31, 1960, and has since been abandoned.

Having thus described the subject matter of our invention what it is desired to secure by Letters Patent is:

1. The process of treating coccidiosis in fowl that comprises introducing into the gastro-intestinal tract of a bird infected with the causative agent of the disease, a poultry feed containing a therapeutically effective amount of a compound selected from the group consisting of 5-nitrobenzimidazoles having attached to the 2-position thereof a member selected from the group consisting of hydrogen and alkyl radicals, and water-soluble salts of such 5-nitrobenzimidazoles.

2. The process of treating coccidiosis in fowl that comprises introducing into the intestinal tract of a bird infected with the causative agent of the disease, a poultry feed containing a 5-nitrobenzimidazole having attached to the 2-position thereof a lower alkyl radical.

3. The process of treating coccidiosis in fowl that comprises introducing into the intestinal tract of a bird infected with the causative agent of the disease, a poultry feed containing a water-soluble acid salt of a 5-nitrobenzimidazole having attached to the 2-position thereof a lower alkyl radical.

4. The process of treating coccidiosis in fowl that comprises introducing into the intestinal tract of a bird infected with the causative agent of the disease, a poultry feed containing 5-nitrobenzimidazole.

5. The process of treating coccidiosis in fowl that comprises introducing into the intestinal tract of a bird infected with the causative agent of the disease, a poultry feed containing a water-soluble acid salt of 5-nitrobenzimidazole.

6. The process of treating coccidiosis in fowl that comprises introducing into the intestinal tract of a bird infected with the causative agent of the disease, a poultry feed containing 2-methyl-5-nitrobenzimidazole.

7. The process of treating coccidiosis in fowl that comprises introducing into the intestinal tract of a bird infected with the causative agent of the disease, a poultry feed containing a water-soluble acid salt of 2-methyl-5-nitrobenzimidazole.

8. The process of treating coccidiosis in fowl, that comprises introducing into the intestinal tract of a bird infected with the causative agent of the disease, a poultry feed containing approximately 0.1 percent by weight of a water-insoluble inorganic acid salt of 2-isopropyl-5-nitrobenzimidazole.

9. The process of treating coccidiosis in fowl, that comprises introducing into the intestinal tract of a bird infected with the causative agent of the disease a poultry feed containing approximately 0.1 percent by weight of 2 - isopropyl - 5 - nitrobenzimidazole hydrochloride, and maintaining said treatment for a period of at least four days.

References Cited in the file of this patent

Schneider: Chem. Abst., vol. 48, p. 8878g.
Scott: JACS, vol. 80 April–June 1958, pp. 2165–2169.